US012074785B2

(12) United States Patent
Lacher

(10) Patent No.: US 12,074,785 B2
(45) Date of Patent: Aug. 27, 2024

(54) LOGICAL LINK REDUNDANT PATHS

(71) Applicant: MICROSOFT TECHNOLOGY LICENSING, LLC, Redmond, WA (US)

(72) Inventor: Michael Lacher, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 17/973,432

(22) Filed: Oct. 25, 2022

(65) Prior Publication Data

US 2024/0163203 A1 May 16, 2024

(51) Int. Cl.
*H04L 45/24* (2022.01)
*H04L 43/0817* (2022.01)
*H04L 45/12* (2022.01)

(52) U.S. Cl.
CPC .......... *H04L 45/24* (2013.01); *H04L 43/0817* (2013.01); *H04L 45/123* (2013.01)

(58) Field of Classification Search
CPC .... H04L 45/24; H04L 43/0817; H04L 45/123
USPC ....................................................... 709/238
See application file for complete search history.

(56) References Cited

U.S. PATENT DOCUMENTS

| 7,570,600 | B1 * | 8/2009 | Slaughter | .............. | H04L 12/282 |
| | | | | | 370/254 |
| 7,636,309 | B2 | 12/2009 | Alicherry et al. | | |
| 9,264,353 | B2 | 2/2016 | Krishnaswamy et al. | | |
| 11,477,117 | B1 | 10/2022 | Ramamurthy | | |
| 2007/0177523 | A1 * | 8/2007 | Nagami | .................. | H04L 43/00 |
| | | | | | 370/242 |
| 2009/0168653 | A1 | 7/2009 | St. Pierre et al. | | |
| 2011/0185068 | A1 * | 7/2011 | Schmieder | .............. | H04L 69/14 |
| | | | | | 709/227 |

(Continued)

FOREIGN PATENT DOCUMENTS

WO    2021217070 A1    10/2021

OTHER PUBLICATIONS

Habib, et al., "Taking Advantage of Multihoming with Session Layer Striping", In Proceedings of 25TH IEEE International Conference on Computer Communications, Apr. 23, 2006, 6 Pages.

(Continued)

*Primary Examiner* — Meng Vang
(74) *Attorney, Agent, or Firm* — Han Gim; Newport IP, LLC

(57) ABSTRACT

A first logical link path and a second logical link path between two endpoints are identified. The first logical link path and the second logical link path comprise an OSI layer 5 link path from source to destination including intermediate network devices. The first logical link path and the second logical link paths include at least a different intermediate network device. A communications session is established between the two endpoints. Data packets for the communications session are communicated using the first logical link path. A metric indicative of a time of receipt of packets on the first logical link path is determined. Based on the metric, presence of a network condition at the communications network that is indicative of a performance degradation of the first logical link path is determined. In response, data packets for the communications session are communicated on the second logical link path.

20 Claims, 14 Drawing Sheets

(56) References Cited

U.S. PATENT DOCUMENTS

| | | | |
|---|---|---|---|
| 2014/0129876 A1* | 5/2014 | Addepalli | H04L 41/0677 |
| | | | 714/E11.029 |
| 2016/0174239 A1 | 6/2016 | Tietsch | |
| 2016/0241465 A1* | 8/2016 | Hasegawa | H04L 45/28 |
| 2020/0127920 A1* | 4/2020 | Miao | H04L 43/10 |
| 2021/0336875 A1 | 10/2021 | Baj et al. | |
| 2021/0400537 A1 | 12/2021 | Zhang et al. | |

OTHER PUBLICATIONS

International Search Report and Written Opinion received for PCT Application No. PCT/US23/031944, Nov. 22, 2023, 21 pages.

* cited by examiner

LOGICAL LINK REDUNDANT PATHS

BACKGROUND

Internet-based transport technologies typically include a packet switched network with built-in fault tolerance at the network layer (International Organization for Standardization (ISO)/Open Systems Interconnection (OSI) Layer 3). Point-to-point traffic flows are typically defined by a source and destination address, and thus individual packets can take alternate routes which can change over time while preserving the source and destination address. By allowing for individual packets to take alternate routes, the network can be considered self-healing with respect to problems that can arise with physical transmission (Layers 2 and below) or problems with specific nodes. By allowing individual nodes in the network to reroute traffic around such problem areas (either through explicit signaling or exploratory/dynamic methods), an alternate working path can be found if such an alternate path exists. It is with respect to these considerations and others that the disclosure made herein is presented.

SUMMARY

One drawback of the above-described self-healing technique is the potential loss, duplication, and reordering of packets which must be handled by various layers in the transport stack (e.g., Transmission Control Protocol (TCP) at ISO/OSI Layer 4). The implementation of such fault handling processes can require significant utilization of resources such as memory and compute cycles. The present disclosure describes technologies for implementing the dynamic routing of packets using alternate, redundant logical paths at ISO/OSI Layer 5, which enables network traffic resilience via path re-routing without the drawbacks noted above.

In many network scenarios, link issues can cause patterns of delays or drops of data packets. Such issues can have a negative impact on performance and the user experience and can be difficult to isolate. As traffic bandwidth increases and the scale of the network grows, detecting and fixing these faulty links are even more important. At the same time, identifying such links can be difficult, especially if the problem is latent and not reported in service provider metrics. Moreover, packet losses might occur due to congestion instead of network equipment failures, making it more difficult to identify the faulty link. Finally, unfocused attempts to collect link data can result in a large amount of data that must be processed potentially without generating any actionable intelligence.

In various embodiments, methods and systems are disclosed for distributing data traffic flow between two endpoints using a dynamically updated list of logical links, each of the logical links utilizing a transport such as TCP or User Datagram Protocol (UDP). Each logical link encompasses a complete path from source to destination (including intermediate gateways, proxies, etc.). Thus, by having different logical links that use different nodes such as gateway instances, fault tolerance through diverse network paths can be achieved and single points of failure can be avoided or eliminated.

In an embodiment, a metric is defined that is indicative of packet latency as an indicator of logical link health, for example using time of receipt of packets. The metric is used to determine that a link is potentially unhealthy, and thus to determine that data traffic should be switched to a healthy logical link. Since each logical link can have different source and/or destination addresses, a transition of addresses for an endpoint (moving from WI-FI to a cellular network, for example) can be implemented.

Implementation of multiple routes is typically performed at a higher OSI level (e.g., OSI Layer 7) which requires a significant amount of logic around each of the individual transports, or at a lower OSI level (e.g., OSI Layer 2) which requires no effort by the user but is usually only possible for static configurations. Furthermore, implementation at a lower OSI layer can require duplication of hardware (e.g., network interface card (NIC) teaming). By implementing dynamic routing of packets at ISO/OSI Layer 5, the requirements that need to be implemented for individual links can be minimized and the number and types of links in use can be dynamically reconfigured, which is highly beneficial for connections in fluid network configurations (e.g., switching from WIFI to a cellular network).

This Summary is provided to introduce a selection of concepts in a simplified form that are further described below in the Detailed Description. This Summary is not intended to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Generally, Internet Protocol (IP) networks enable resiliency for single point-to-point traffic flows, whereas many modern network topologies do not allow for such direct point-to-point traffic flows (e.g., firewalls, gateways, and proxies that split the end-to-end path into multiple segments). Additionally, the increasing mobility of modern devices (e.g., smartphones and Internet of Things (IoT) devices) mean that the source and/or destination address of a flow are no longer fixed for the duration of the flow. These circumstances present two problems for fault tolerance in modern networking.

First, a problem in any of the nodes that tie segments together in an end-to-end IP data path can cause the traffic flow to fail. Such nodes can become single points of failures, as higher stack levels (typically ISO/OSI 5-7) can either force the critical node to be a source or destination, or force routing through a critical node.

Second, typical transport (ISO/OSI layer 4) protocols (e.g., TCP/UDP) do not allow source and destination addresses to be changed. If a transport protocol does allow source and destination addresses to be changed, the transport protocol does not provide a potentially built-in method for signaling this change to a peer, meaning that a separate signaling method is required to effect the changing of source and destination addresses, which in turn creates another point of failure.

Figure 1A:
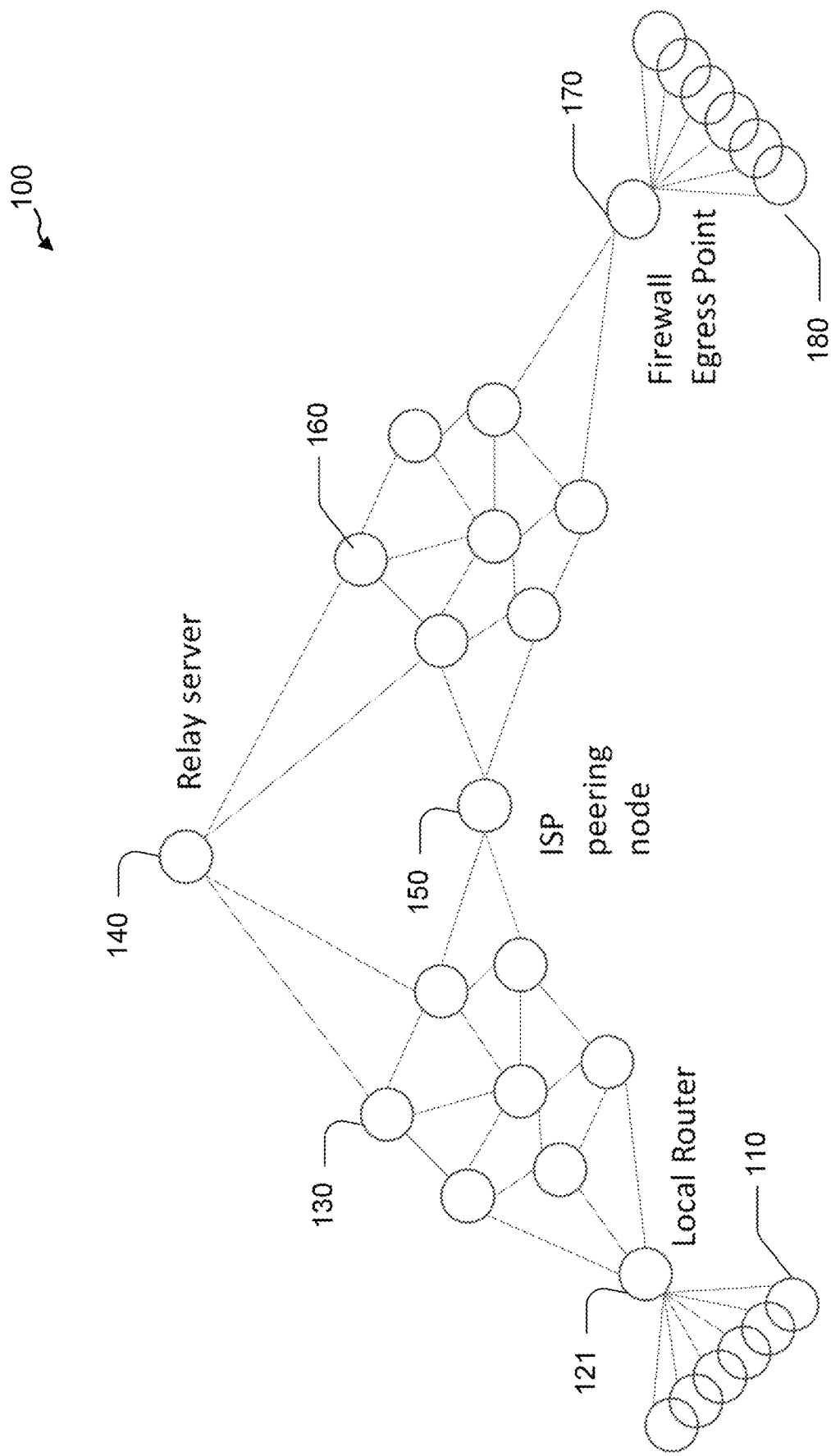
FIG. 1A is a diagram illustrating an example network in accordance with the present disclosure.

In the example shown in FIG. 1A, illustrated is a network that comprises various nodes. The network 100 includes, for example, various user endpoints, network nodes, and an endpoint at a service provider. Various user devices 110 in a localized environment include computers connected to a local WIFI network that are connected to a local router 120. The service provider can have a number of host and other endpoints 180 and a firewall egress point 170. Intermediate providers can implement devices such as a relay server 140, various intermediate nodes 130, 160, ISP peering node 150, and the like. The present disclosure describes ways to establish dynamic routing of data at ISO/OSI layer 5. Data traffic can be communicated by a dynamically changing list of links between two endpoints, each utilizing a transport such as TCP or UDP. Each link encompasses a complete path from source to destination including intermediate gateways, proxies, etc., so by having different paths using different gateway instances fault tolerance can be achieved for a given link. The examples illustrated in this disclosure refer to such ISO/OSI layer S links as session links or logical links.

In conventional link failure response mechanisms, when a problem with a link is detected, the current connection is typically torn down and a new connection is established from the source to the destination (e.g., client to the server). A problem with a link can refer to broken links, such as those associated with a failure of a node in a link, such as a relay server failure. A problem can also be related to issues where packet latencies meet or exceed a time t threshold. Methods for detecting such failures are further described herein.

Figure 2A:
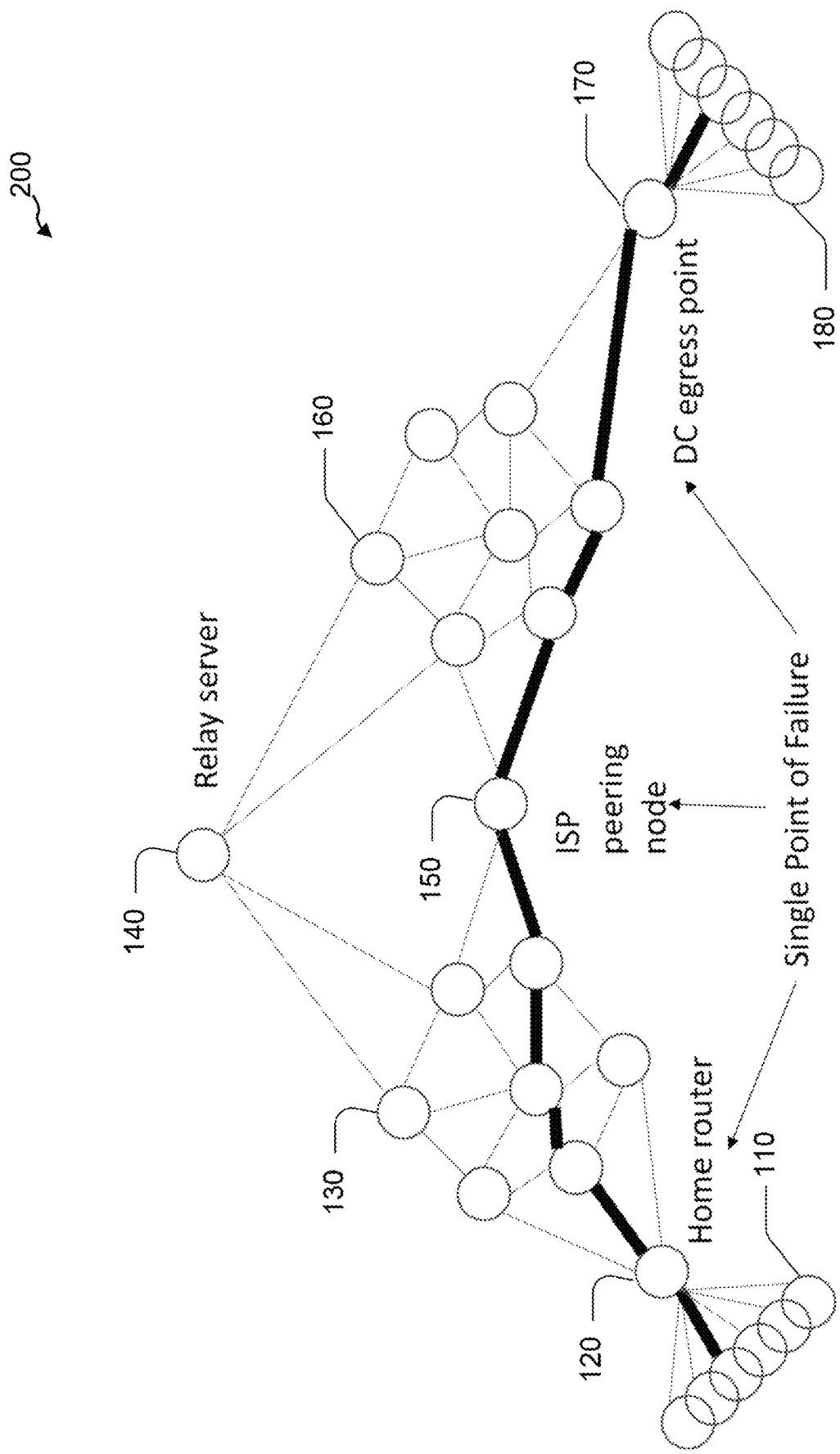
FIG. 2A is a diagram illustrating an example of a data link in accordance with the present disclosure.

While tearing down and establishing a new connection can address some network issues, when a single point of failure is present, new connections will similarly be unable to circumvent the single point of failure. For example, with reference to FIG. 2A, local router 120, ISP peering node 150, and the data center (DC) firewall egress point 170 are single points of failure for an established path because they must be traversed for the identified network path.

Figure 1B:
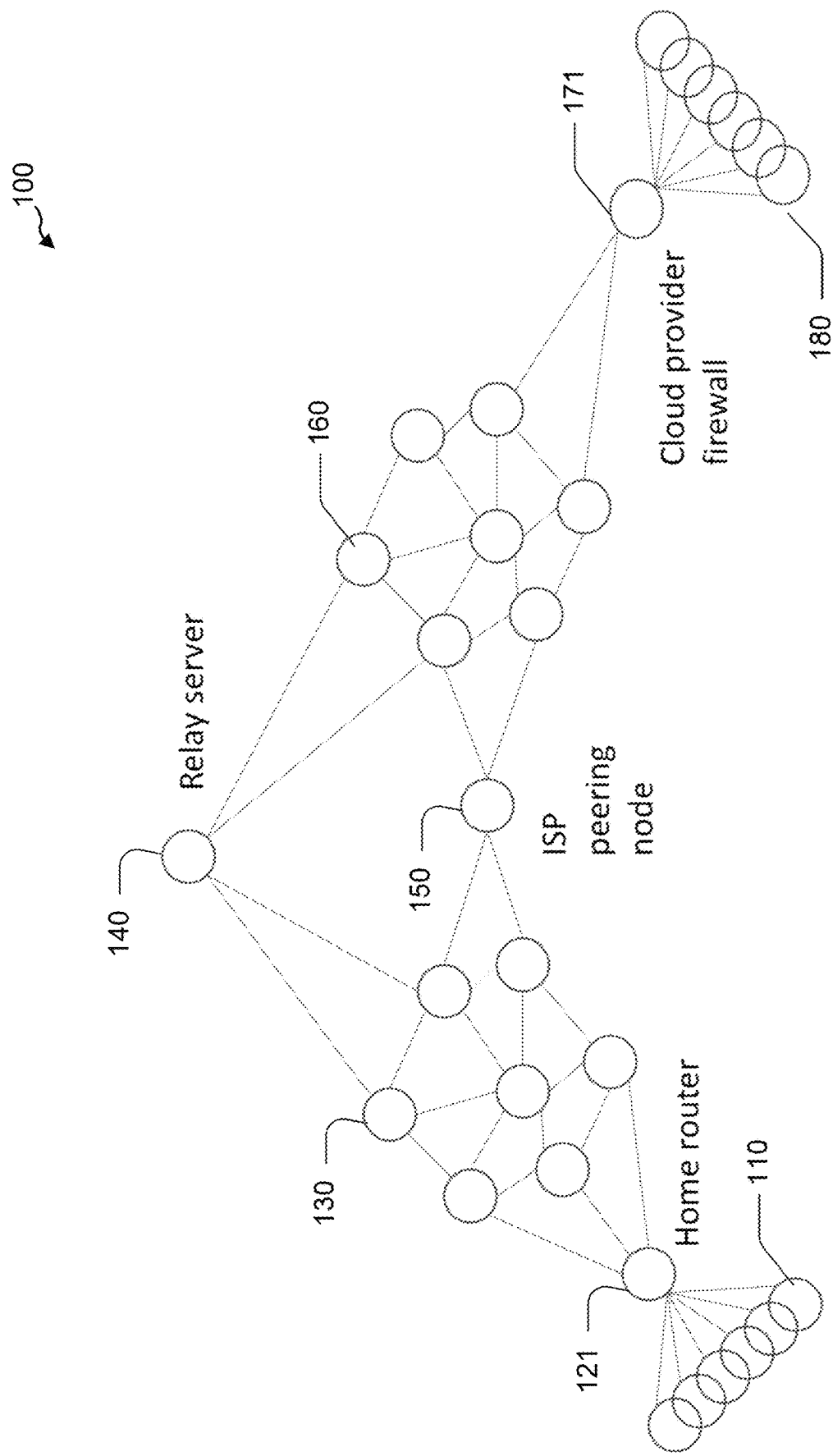
FIG. 1B is a diagram illustrating an example network in accordance with the present disclosure.

In the example shown in FIG. 1B, an example network that comprises various nodes in a typical home to service provider scenario is illustrated. The network 100 includes, for example, various user endpoints, network nodes, and an endpoint at a service provider. Various user devices 110 in a home environment include computers connected to a local WIFI network, for example mobile phones, laptop, and consoles that are connected to a home router 121. The service provider can have a number of host and other endpoints 180 and an egress point such as cloud provider firewall 171. Intermediate providers can implement devices such as a relay server 140, various intermediate nodes 130, 160, ISP peering node 150, and the like.

The present disclosure describes technologies for implementing dynamic routing using logical links at ISO/OSI Layer 5. In various embodiments, data traffic can utilize a dynamically changing list of logical links, each logical link utilizing a transport such as TCP or UDP. Each logical link provides a complete path from source to destination (including intermediate gateways, proxies, etc.). Fault tolerance is achieved by having different single points-of-failure (e.g., gateway instances) utilize different logical links. Multiple different logical links that are valid and active (referred to as the "active logical link") are identified, and when a problem is detected for the logical link being used for data transmission (referred to as the "current logical link"), one of the other active logical links can be substituted and used for data transmission. As the other active logical links are already established, the time to begin using the other healthy logical links can be made with little latency. Additionally, implementation at Layer 5 provides for minimal overhead in implementing the mechanisms for switching among the valid active logical links.

In an embodiment, a metric is defined that is indicative of packet latency as an indicator of logical link health, for example using time of receipt of packets. In an embodiment, the metric is determined based on the elapsed time between packets on a logical link, where longer elapsed time between packets in a path is correlated to the trust in the path. The metric is used to determine the health of a logical link, which in turn is used to make a determination to switch packets among the other healthy links. Because each logical link can have different source and/or destination addresses, the addresses for an endpoint can be transitioned (e.g., move from a Wi-Fi network to a cellular network). As used herein, when determining link health as described herein, the term metric refers to a variable that can be defined by additional elements such as scaling factors, expressions, and other descriptive factors.

In an embodiment, packets are sent on active links that are not currently being used for data traffic (referred to as "secondary active logical links") on a regular or periodic basis so that metrics can be collected and maintained for all active and valid links. In some embodiments, the packets used for determining the metric can be actual data packets rather than synthesized probe traffic such as heartbeat packets. As described further herein, the metric can indicate health status based only on traffic being sent and received and without the need for administrative or overhead packets. Additionally, there is further no need to negotiate which is the primary link and which is the secondary link, or for the endpoints to indicate which is link is being used as the primary link, greatly reducing the amount of link status information that must be negotiated and maintained.

Figure 2B:
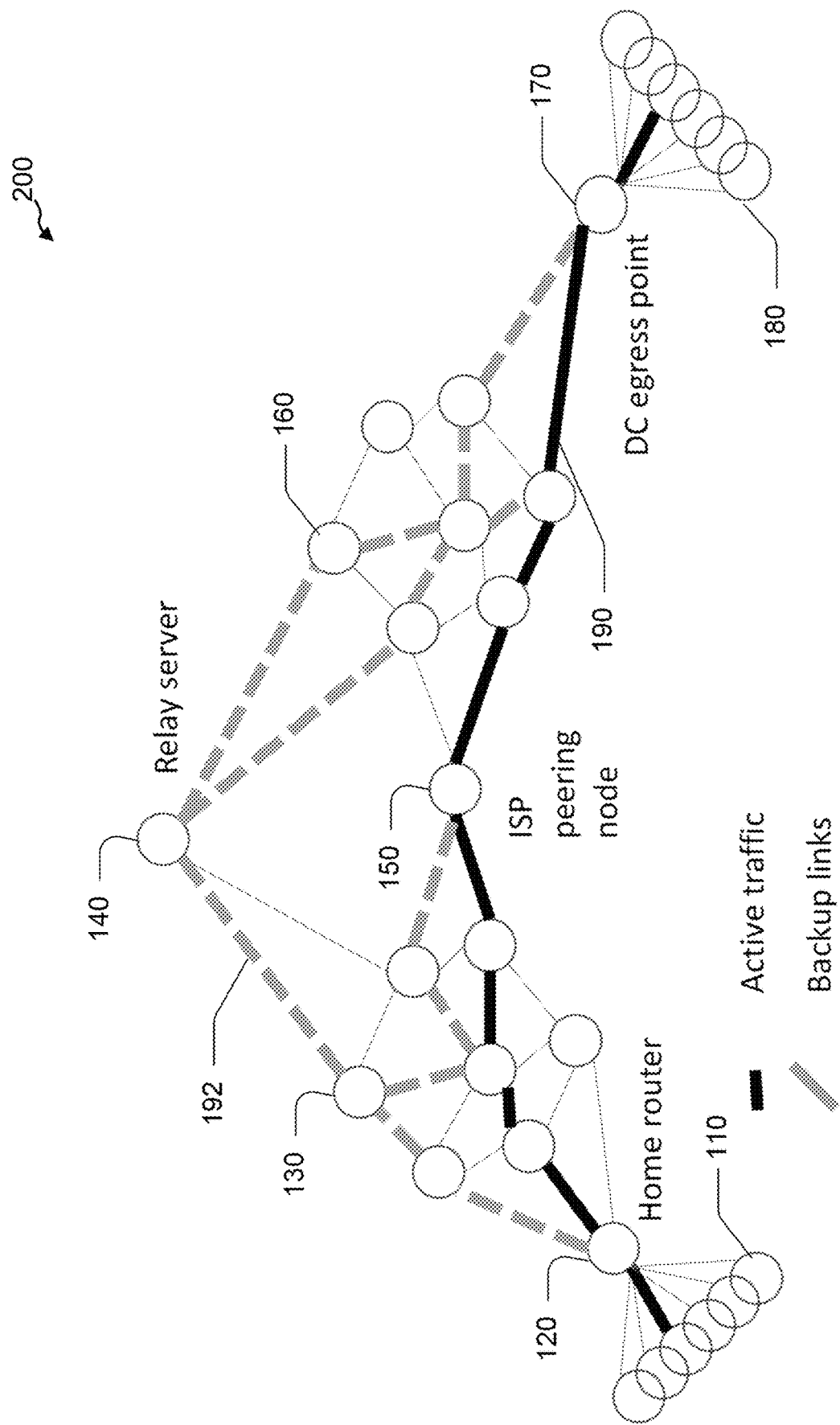
FIG. 2B is a diagram illustrating an example of a data link in accordance with the present disclosure.
Figure 2C:
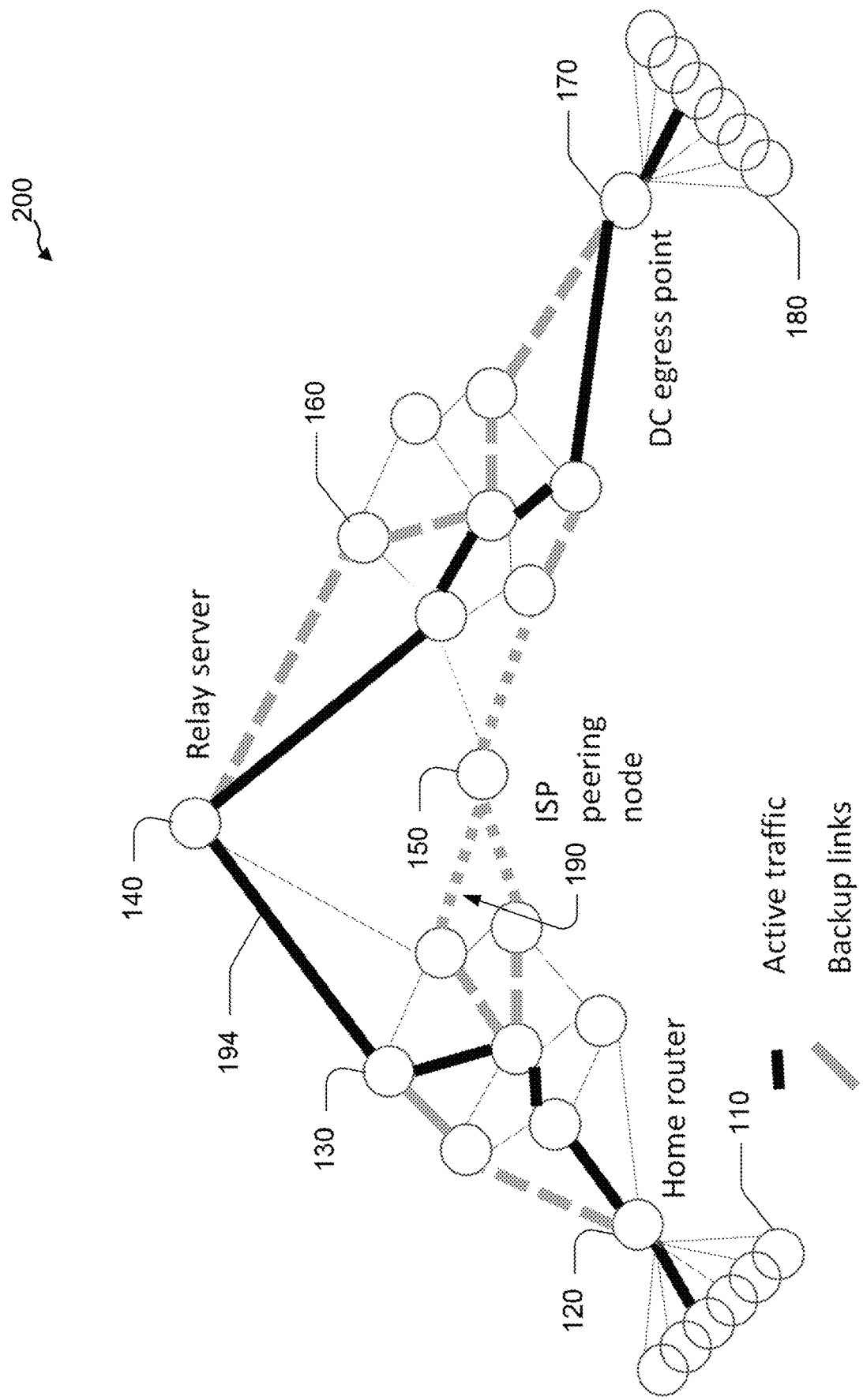
FIG. 2C is a diagram illustrating an example of a data link in accordance with the present disclosure.
Figure 2D:
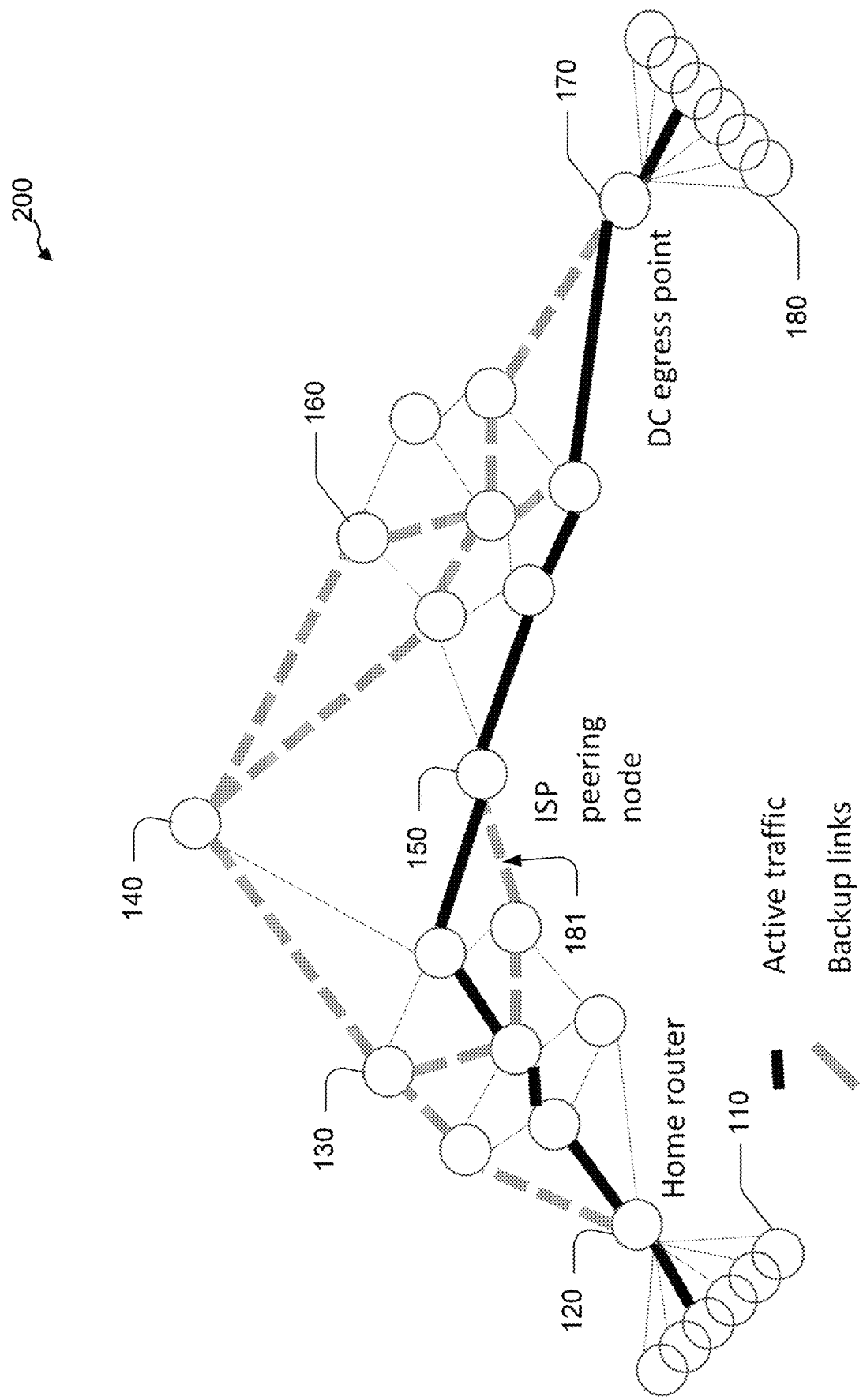
FIG. 2D is a diagram illustrating an example of a data link in accordance with the present disclosure.

FIG. 2B illustrates a current logical link 190. A number of logical links that are not currently being used for active data transmission but are valid and available (referred to as "backup logical link") include backup logical link 192 routed through different nodes of the network. FIG. 2C illustrates that a problem that occurs with ISP peering node 150 can cause a break in the network path that includes link 190. FIG. 2C illustrates that a new active link 194 is used, based on the metric for link health as disclosed herein. FIG. 2D illustrates that the previous active link illustrated in FIG. 2B can be used when the problem with ISP peering node 150 is resolved, except that the active link includes link 181. Thus, a number of active links can be maintained and used as needed using the described techniques to respond to failures at nodes in a network.

The list of logical links as well as the link health can be self-synchronized. Alternatively, the list of logical links can be explicitly signaled, allowing for external control, if desired. Furthermore, specific implementations for switching traffic between multiple healthy links can be tuned, for example by a managing application, to implement desired behaviors (e.g., forward error correction, link teaming, cost control, and latency control).

From an interface perspective, the described embodiments can be observed as a transport protocol (Layer 4) that is targeted and/or lossy.

If the protocol is targeted, traffic for a given logical link flows to exactly one logical endpoint (the IP address of the endpoint can change, but the logical identity does not change). If the protocol is lossy, packets are allowed to be lost, duplicated, or reordered. An additional protocol can be implemented at a higher layer to enable reliable semantics if desired (e.g., TCP can be implemented over the disclosed embodiments).

The disclosed techniques can be implemented either independently as a separate protocol, or integrated with other protocols which have multiple logical links between two peers, such as Interactive Connectivity Establishment (ICE).

Figure 3A:
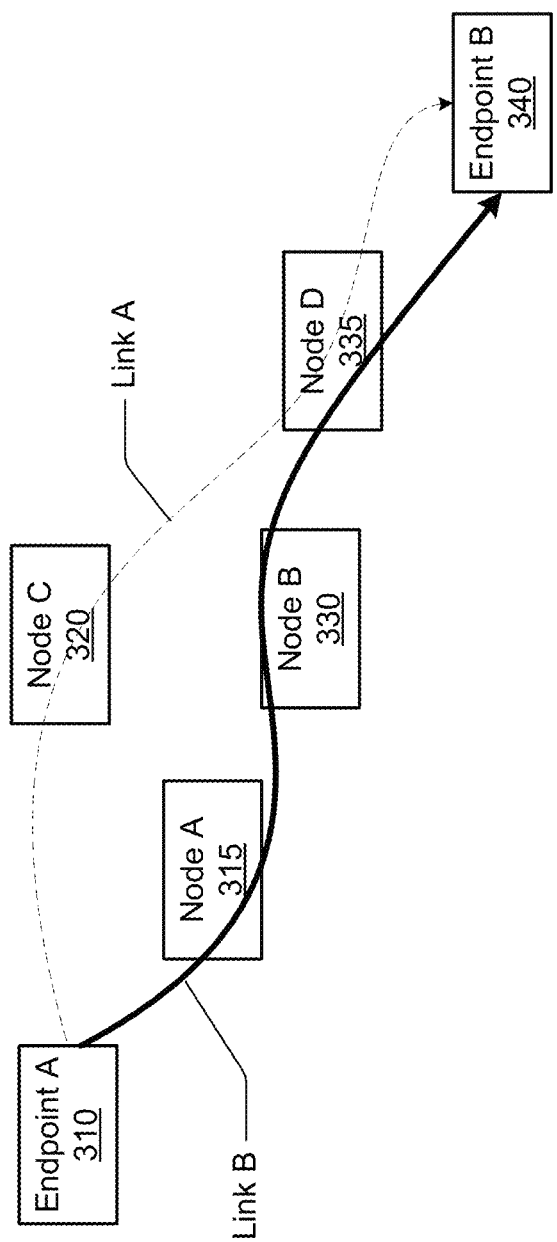
FIG. 3A is a diagram illustrating an example of data link changes in accordance with the present disclosure.
Figure 3B:
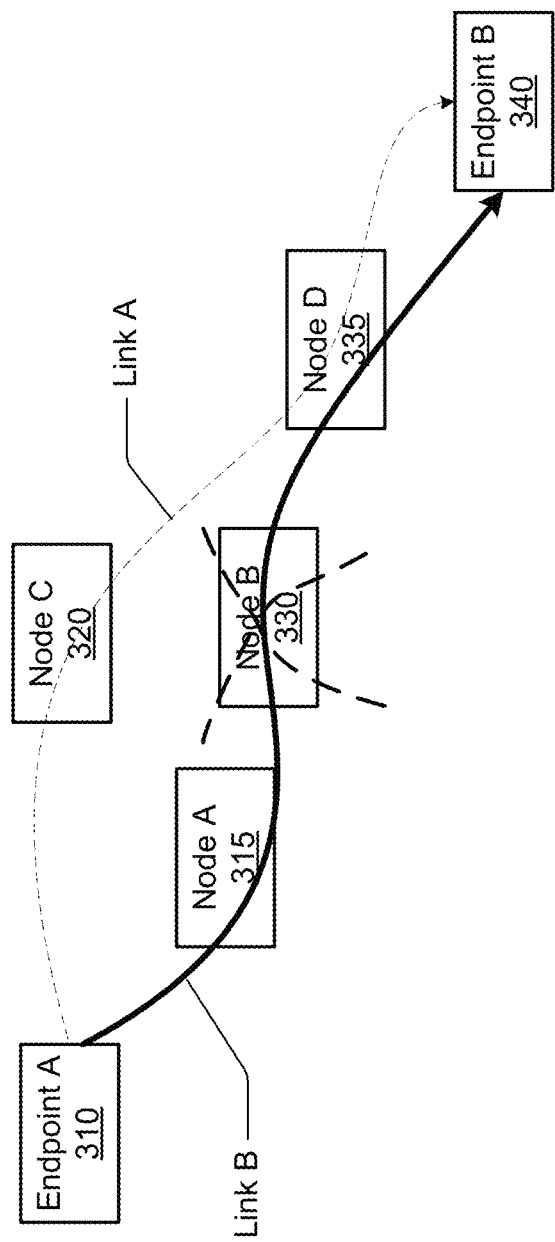
FIG. 3B is a diagram illustrating an example of data link changes in accordance with the present disclosure.
Figure 3C:
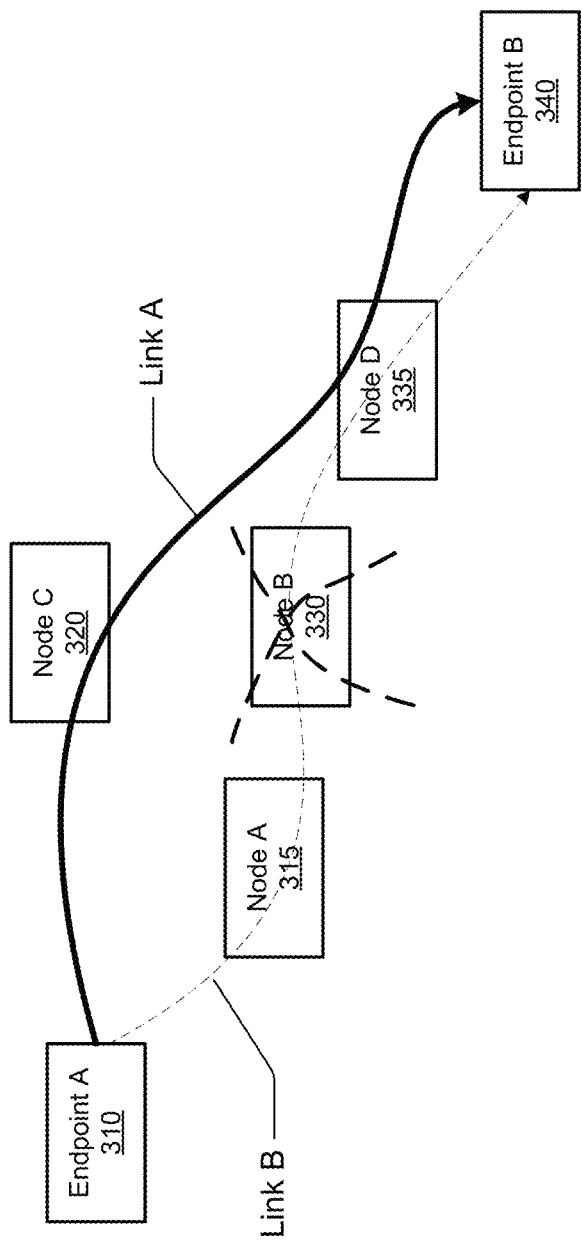
FIG. 3C is a diagram illustrating an example of data link changes in accordance with the present disclosure.

As used herein, a logical path can be a network link that includes one or more physical links, which can include network devices such as a switch or router and can be implemented as hardware, software, or a combination. More generally, a link that be any type of communications link between two network devices, endpoints, or other nodes. As used herein, a link may be used to communicate data between two such nodes, and such a link may also be referred to as a data link. FIG. 3A illustrates an active link B being used for transmitting data packets from endpoint A 310 to endpoint B 340 via nodes 315, 330, and 335. Link A is also available for sending packets if needed through nodes 320, 335. Nodes 315 and 330 are points of failure for link B. A point of failure refers to any node that prevents or delays passage of data through the node in a way that causes latencies beyond a threshold, or loss of data. A point of failure that has no alternative path around the point of failure such that the point of failure causes degradation or loss of services can be referred to as a single point of failure. FIG. 3B illustrates that when a problem occurs with node 330, a break in the network path can result. FIG. 3C illustrates that link A is used to circumvent the failure at Node 330 and continue to send packets from endpoint A 310 to endpoint B 340.

In the disclosed embodiments, each logical link (e.g., an active healthy link that is being used to transmit data, or a backup link that is healthy although not being used currently to transmit data) can be defined by a 3-tuple:

$t_{recv}$: The time that the last packet was received on this link in the client's local clock $t_{send}$: The time that the last packet was sent on this link in the client's local clock Link specific information indicating how to send packets using this link. For example, for a UDP link, information can include a pair of IP addresses and ports. The link specific information is opaque to the disclosed techniques and used to integrate the techniques with the application.

The disclosed algorithm maintains the following overall state:

L: Set of all logical links.

$l_{active} \in L$: the currently active link (or a special value "null" to indicate that no link is active).

$\lambda \in \mathbb{R}, \lambda > 0$: A scaling factor to control how quickly health degrades over time. As shown below, $\rho \in \mathbb{R}, \rho > 0$: A scaling factor to control how often to probe the links in addition to regular traffic.

$\sigma \in \mathbb{R}, 0 \leq \sigma < 1$: A hysteresis parameter to control switching between different links of similar health.

The health for link l at time t is defined as $$H(l,t) = 2^{\lambda(t_{recv}(l)-t)} \text{ or } H(l,t) = e^{\lambda(t_{recv}(l)-t)}$$

and the desire to test a link as $$D(l,t) = \rho(t - t_{send}(l))$$

L is initialized to the empty set, $l_{active}$ is initialized to $\omega$, and $\lambda, \rho, \sigma$ as desired by the application using the following guidelines:

$\lambda$ and $\sigma$ and a depend on each other and the frequency packets are received in the typical case. $\lambda$ can be selected so that the health change of a link over the period that a packet is typically received is less than $\sigma$. In an embodiment, the algorithm continues using a link even when no packets are received on the link for at least $$\frac{\log_2 1 - \sigma}{-\lambda}$$

time units.

$\rho$ can be selected so that currently non-active links are tested as often as desired. Because the testing of links results in duplicate packets, additional overhead can be incurred. The managing application can implement a balance between the frequency of testing (e.g., faster switching) and lower bandwidth overhead.

While the determination of link health is illustrated using logical links, the disclosed methods can be used to determine the health of any communications link that is used to communication data packets between two endpoints or nodes of the communications link (e.g., between a source and destination). Thus the disclosed embodiments may be used to determine the link health of a TCP/IP link or session and other protocols.

Figure 4:
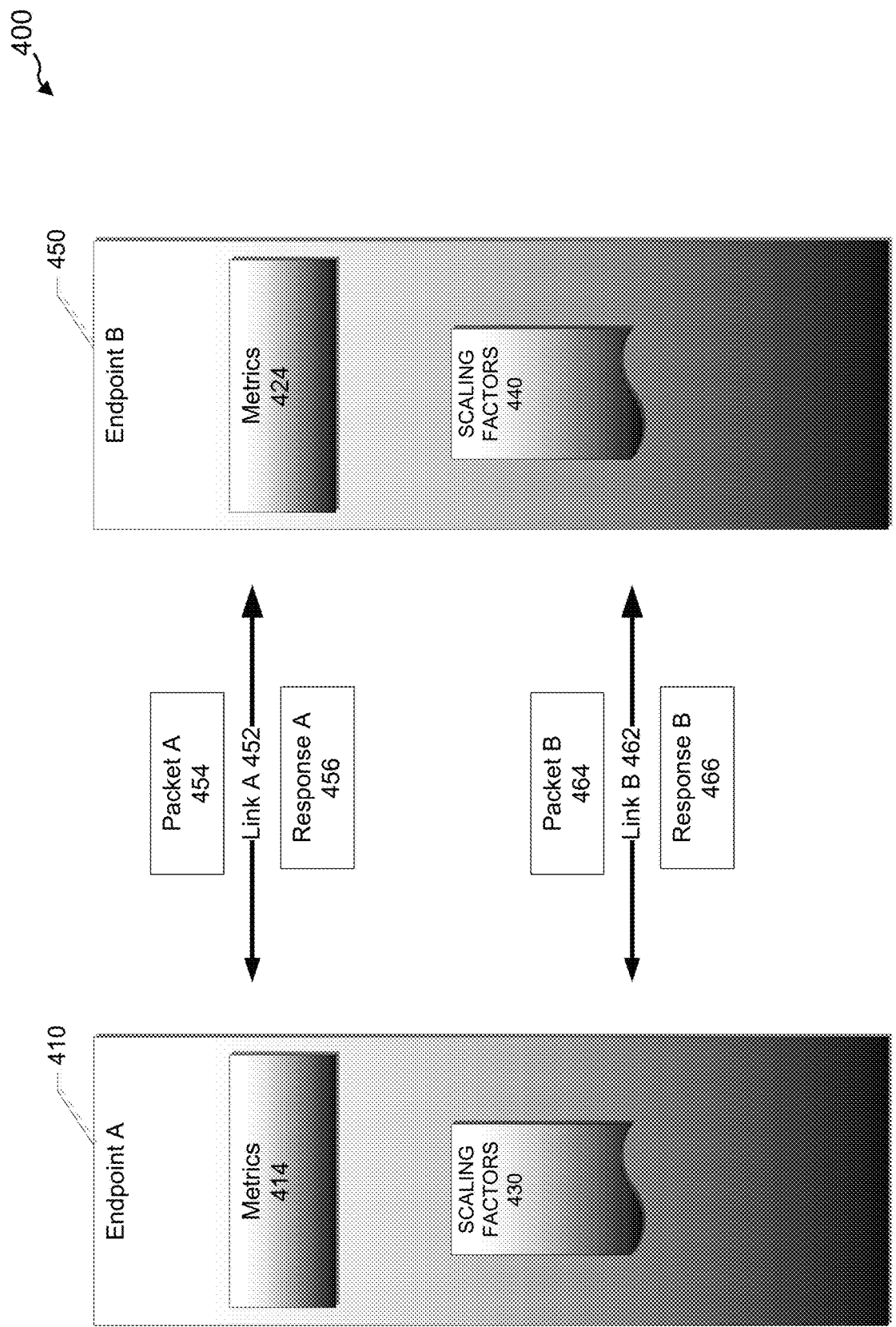
FIG. 4 is a diagram illustrating an example of link health determination between two endpoints.

Referring to FIG. 4, illustrated is an example network 400 that includes two endpoints 410 and 450. One or both of the endpoints 410 and 450 monitors logical link A 452 and logical link B 462. Logical link A 452 is used to send packet A 454 and response A 456. Logical link B 462 is used to send packet B 464 and response B 466. Endpoints 410 and 450 are configured to store or access scaling factors 430 and 440 which include scaling factor $\lambda$ for controlling how quickly health degrades over time and scaling factor $\rho$ for controlling how often to probe the links in addition to regular traffic. In some embodiments, endpoints are also configured to store or access hysteresis parameter $\sigma$ for controlling switching between different links of similar health. Endpoints 410 and 450 are configured to determine metrics 414 and 424 which includes the health for a link l at time t and the desire to test a link. The metric 414 is determined based on the time that the last packet 454 or 456 was received as determined by a local clock of endpoint 410 or 450 or the time that the last packet was sent as determined by a local clock of endpoint 410 or 450. The metric 424 is determined based on the time that the last packet 464 or 466 was received as determined by a local clock of endpoint 410 or 450 or the time that the last packet was sent as determined by a local clock of endpoint 410 or 450.

In an embodiment, when a peer sends a packet, the peer performs a procedure to select an active link which can be based on the health of the currently active link and the health of other available links. In the example shown below, the peer performs the procedure SEND after performing the procedure SELECTSEND and SELECTTEST:

```
procedure SELECTSEND (t ∈ ℝ)
    l_new := argmax H(l, t)
              l∈L
    if (l_active = ω) ∨ (H(l_new, t) > H(l_active, t) + σ) then
        l_active := l_new
    end if
    return l_active
end procedure
procedure SELECTTEST (t ∈ ℝ)

l := argmax D(l, t)
         l∈L if D(l, t) > 1 then
        return l
    else
        return null
    end if
end procedure
procedure SEND(packet)
    t_now := < current time >
    l_1 := SELECTSEND(t_now)
    l_2 := SELECTTEST(t_now)
    SEND packet ON l_1
    t_send(l_1) := t_now
    if (l_2 ≠ l_1) ∧ (l_2 ≠ null) then
        SEND packet ON l_2
        t_send (l_2) := t_now
    end if
end procedure
```

In an embodiment, when a peer receives any packet on a link, the peer performs a procedure to track the time that the packet was received on the link. In the example shown below, the peer performs the algorithm RECEIVE:

```
procedure RECEIVE (l ∈ EL)
    t_recv (l) := <current time>
end procedure
```

In an embodiment, links are added and removed at any time. To add a link, a procedure may be performed to add new a new link which is initialized to a negative infinity value. In the example shown below, the algorithm ADDLINK is performed. The choice of −∞ to initialize the state means the link is treated as initially unhealthy and will be tested immediately:

```
procedure ADDLINK(l ∉ L)
    t_recv (l) := −∞
    t_send (l) := −∞
    L := L ∪ {l}
end procedure
```

To remove a link, a procedure may be performed to remove the link from the set of links L. In an embodiment, the procedure REMOVELINK is performed in the event the active link is removed:

```
procedure REMOVELINK (l ∈ L)
    if l_active = l then
        l_active := null
    end if
    L := L − {l}
end procedure
```

In an embodiment, optimization specific links are prioritized based on characteristics such as the amount of resources required to send data on the link, latency of the link (time required to send packet to peer); and/or manually configured parameters.

Such preferences can be expressed by one or more of the parameters δ, ρ, σ being link-specific instead of global to the algorithm, or by assigning a bonus to a link during calculation of H.

The function H uses exponential decay, which can be calculated quickly but also drops off quickly after receiving a packet. In an embodiment, a sigmoid shaped function is used to represent that the health of a link is likely still high for a short time after receiving a packet and that the health only starts to decay at a later time.

In one embodiment, a Bayesian estimator is used to measure health without requiring the manual configuration of parameters.

In an embodiment, a proof of evaluation includes defining the desire to test a link $D(l,t)$ so that the desire is monotonically increasing with time unless data is sent over this link (it is evaluated).

As the desire is monotonically increasing, every link must eventually reach the testing threshold.

As the desire to test grows at the same rate for all links, the order of links in relation to the desire never changes unless a packet is sent.

The only links that change position in this order are the active link and the link tested.

This guarantees that every link is tested in turn before being reset (or that link is the active link).

On average each link is tested once every $1/\rho$ time units.

A proof of convergence in one embodiment includes:

Assume two peers A and B are connected using two links $l_1$ and $l_2$.

Assume that at time $t_0$ peer A sends a packet on $l_{active}=l_1$ and that for peer B $l_{active}=l_2$ at that same time.

Because link health is driven by receipt of data and not the sending of data, the health of $l_{active}$ will decrease for both peers, while the health of the complementary link will be consistently reset to one.

At some point $$t_0 \le t \le t_0 + \frac{\log_2 1 - \sigma}{-\lambda} + \frac{1}{\rho},$$

either one of both peers will switch their respective $l_{active}$ to the complementary link.

If only a single peer switches, then the opposite peer will receive a packet on their active link, and its health will be reset to one. At this point their active link has the highest health of all links and will therefore stay active and convergence is achieved.

If both peers were to switch at the same time, the situation would be analogous to the situation at $t_0$.

For this situation to occur, the time to transmit a packet must be longer than the time the peer waits to send a packet, which is not typical.

It can therefore be concluded that convergence will eventually take place.

A proof of self-healing in one embodiment includes:

It has been shown that every link is evaluated on average once every $1/\rho$ time units.

At any point in time, both peers will therefore have a positive health value for all links which are not broken.

For both peers, the health of a broken $l_{active}$ will eventually be low enough to force a switch to one of the healthy links.

It has been shown that both peers will eventually converge onto the same active link.

The maximum time for the first switch to a healthy link is $$\frac{\log_2 1 - \sigma}{-\lambda} + \frac{1}{\rho}$$

time units.

Figure 5:
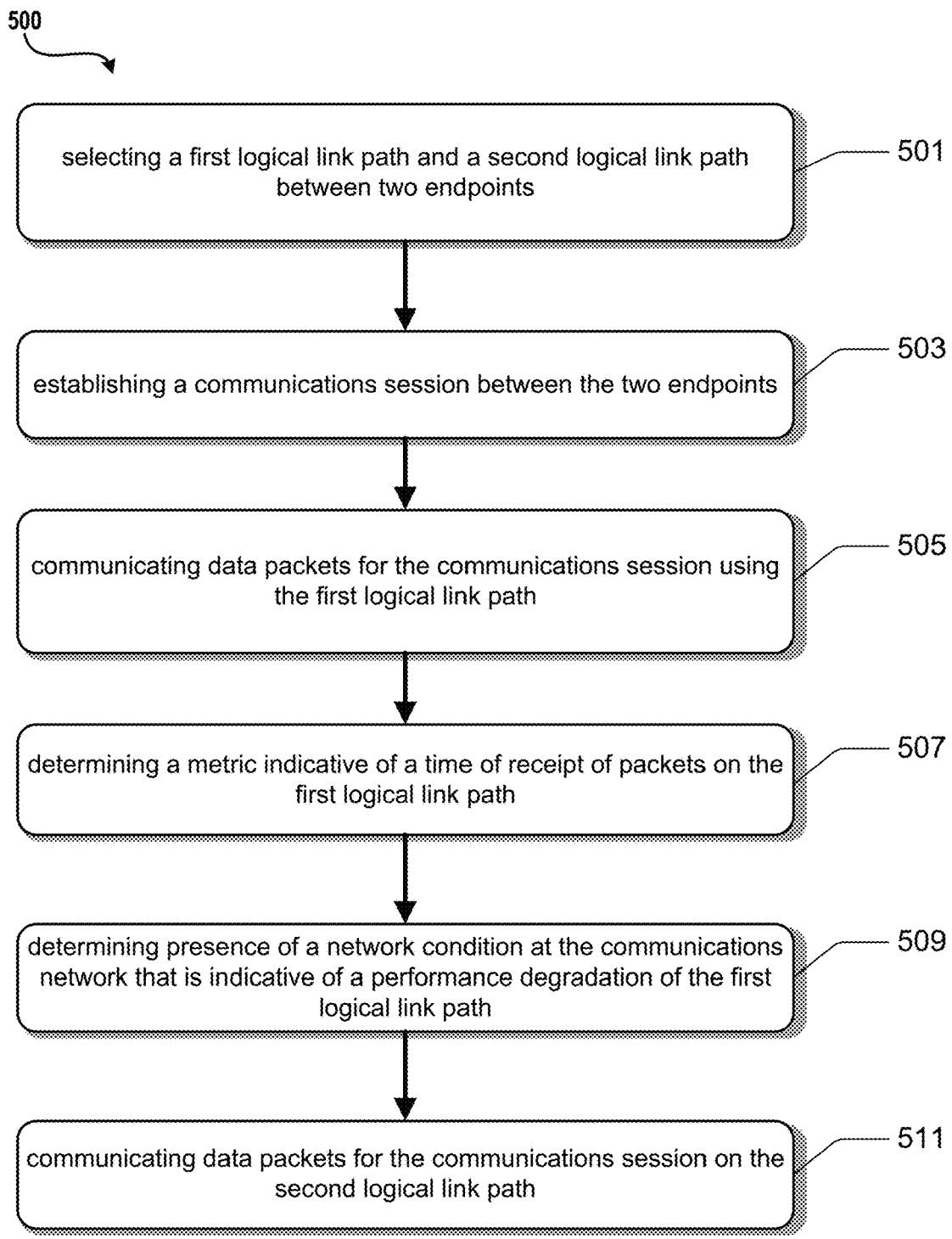
FIG. 5 is a flowchart depicting an example procedure in accordance with the present disclosure.

Turning now to FIG. 5, illustrated is an example procedure for determining health of a link in a communications network comprising a plurality of network devices in accordance with the present disclosure. Such a procedure provides for determining health of a link and can be provided by functions illustrated, for example, in FIGS. 1-4. The procedure can be implemented in a system comprising one or more computing devices. Referring to FIG. 5, operation 501 illustrates selecting a first logical link path and a second logical link path between a first endpoint and a second endpoint of the communications network. In an embodiment, the first logical link path and the second logical link path each comprise an International Organization for Standardization (OSI) layer 5 logical link path from the first endpoint to the second endpoint including a respective intermediate network device of the plurality of network devices. In an embodiment, the respective intermediate network device for the first logical link path is different than the respective intermediate network device for the second logical link path. Logical link paths can be established using OSI protocol suite session-layer protocols as is known in the art. The session-layer protocols provide mechanisms for opening, closing and managing a session between end points. Multiple such logical link paths can be established and the first logical link path and the second logical link path can be selected from such established logical link paths.

Operation 501 is followed by operation 503. Operation 503 illustrates establishing a communications session between the first endpoint and second endpoint.

Operation 503 is followed by operation 505. Operation 505 illustrates communicating data packets for the communications session using the first logical link path.

Operation 505 is followed by operation 507. Operation 507 illustrates determining a metric indicative of a time of receipt of packets on the first logical link path.

Operation 507 is followed by operation 509. Operation 509 illustrates determining that a performance of the second logical link path is better than a performance of the first logical link path.

Operation 509 is followed by operation 511. Operation 511 illustrates in response to determining the performance of the second logical link path is better than a performance of the first logical link path, communicating additional data packets for the communications session on the second logical link path.

Figure 6:
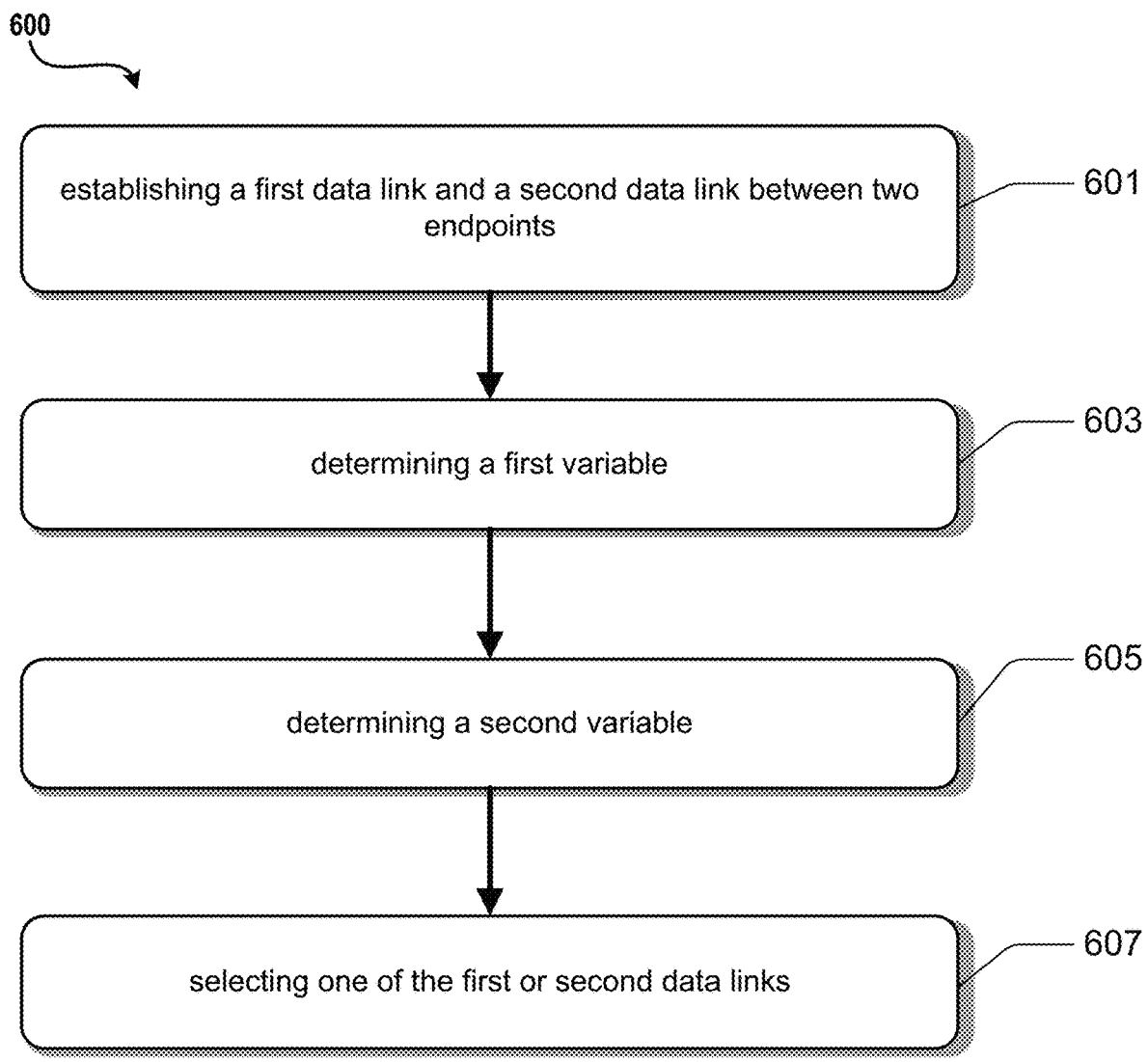
FIG. 6 is a flowchart depicting an example procedure in accordance with the present disclosure.

Turning now to FIG. 6, illustrated is an example procedure for determining health of a link in a communications network comprising a plurality of network devices in accordance with the present disclosure. Such a procedure provides for determining health of a link and can be provided by functions illustrated, for example, in FIGS. 1-5. The procedure is implemented in a system comprising one or more computing devices. Referring to FIG. 6, operation 601 illustrates establishing a first data link and a second data link between two endpoints of the communications network.

Operation 601 is followed by operation 603. Operation 603 illustrates for each of the first and second data links, determining a first metric based on: a first scaling factor for characterizing link health, and a time at which a most recent packet was received on the respective data link. In an embodiment, the first scaling factor is for characterizing how quickly link health degrades over time.

Operation 603 is followed by operation 605. Operation 605 illustrates for each of the first and second data links, determining a second metric determined based on a second scaling factor for controlling how often to probe the first and second data links in addition to regular data packets. In an embodiment, the second metric is determined based on a second scaling factor for controlling how often to probe the first and second data links in addition to regular data packets. In an embodiment, the second metric is indicative of a desire to test the link health of the first and second data links.

Operation 605 is followed by operation 607. Operation 607 illustrates based on the first and second metrics, selecting one of the first or second data links.

The various aspects of the disclosure are described herein with regard to certain examples and embodiments, which are intended to illustrate the disclosure. It should be appreciated that the subject matter presented herein is implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations is performed in combination with other types of program modules. Generally, program modules include routines, programs, components, data structures and other types of structures that perform particular tasks or implement particular abstract data types.

Those skilled in the art will also appreciate that the subject matter described herein can be practiced on or in conjunction with other computer system configurations beyond those described herein, including multiprocessor systems. The embodiments described herein can also be practiced in distributed computing environments, where tasks are performed by remote processing devices that are linked through a communications network. In a distributed computing environment, program modules are located in both local and remote memory storage devices.

Networks established by or on behalf of a user to provide one or more services (such as various types of cloud-based computing or storage) accessible via the Internet and/or other networks to a distributed set of clients can be referred to as a service provider. Such a network includes one or more data centers such as data center 700 illustrated in FIG. 7, which are configured to host physical and/or virtualized computer servers, storage devices, networking equipment and the like, that is used to implement and distribute the infrastructure and services offered by the service provider.

Figure 7:
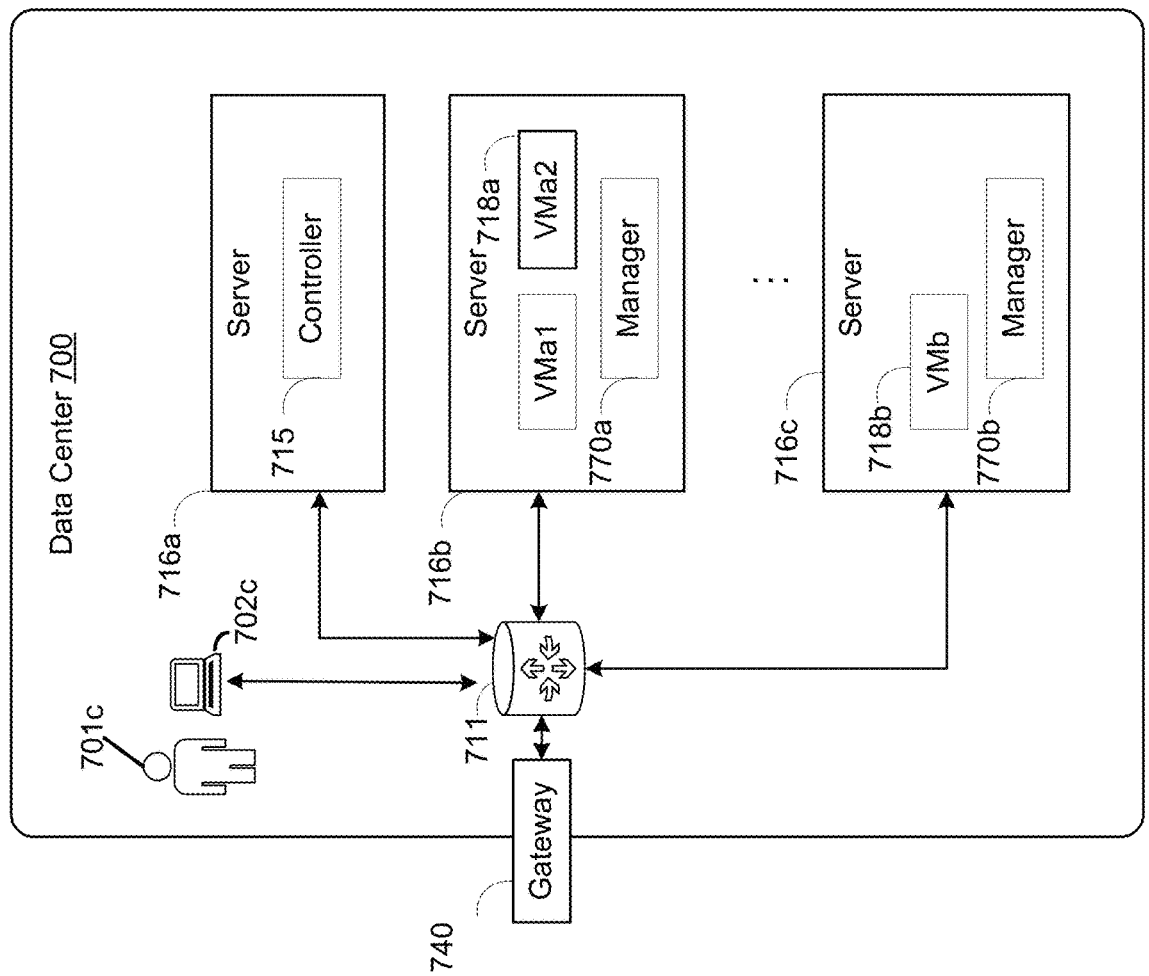
FIG. 7 is a diagram illustrating an example architecture in accordance with the present disclosure.
Figure 7:
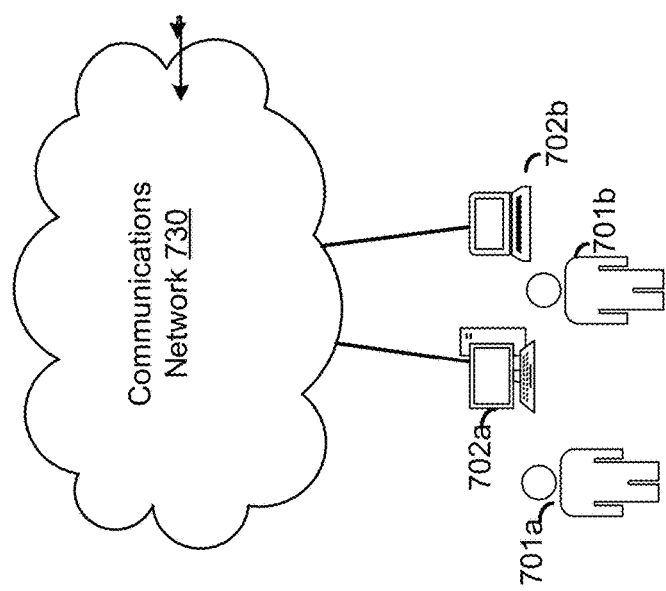

FIG. 7 illustrates a data center 700 that is configured to provide computing resources to users 701a, 701b, or 701c (which is referred herein singularly as "a user 701" or in the plural as "users 701") via user computers 702a, 702b, and 702c (which is referred herein singularly as "a computer 702" or in the plural as "computers 702") via a communications network 730. The computing resources provided by the data center 700 includes various types of resources, such as computing resources, data storage resources, data communication resources, and the like. Each type of computing resource can be general-purpose or available in a number of specific configurations. A virtual computing instance is referred to as a virtual machine and can, for example, comprise one or more servers with a specified computational capacity (which is specified by indicating the type and number of CPUs, the main memory size and so on) and a specified software stack (e.g., a particular version of an operating system, which in turn run on top of a hypervisor). In some embodiments, computing resources are available as virtual machines. The virtual machines are configured to execute applications, including Web servers, application servers, media servers, database servers, and the like. Data storage resources include file storage devices, block storage devices, and the like. Each type of computing resource can be available in different configurations, such as the number of processors, and size of memory and/or storage capacity. The resources in some embodiments are offered to clients in units referred to as instances, such as virtual machine instances or storage instances.

Data center 700 includes servers 716a, 716b, and 716c (referred to herein singularly as "a server 716" or in the plural as "servers 716") that provide computing resources available as virtual machines 718a and 718b (referred to herein singularly as "a virtual machine 718" or in the plural as "virtual machines 718"). The virtual machines 718 are configured to execute applications such as Web servers, application servers, media servers, database servers, and the like. Other resources include data storage resources (not shown on FIG. 7) and include file storage devices, block storage devices, and the like. Servers 716 also execute functions that manage and control allocation of resources in the data center, such as a controller 715. Controller 715 can be a fabric controller or another type of program configured to manage the allocation of virtual machines on servers 716.

Referring to FIG. 7, communications network 730 can, for example, be a publicly accessible network of linked networks and operated by various entities, such as the Internet. In other embodiments, communications network 730 is a private network, such as a corporate network that is wholly or partially inaccessible to the public.

Communications network 730 provides access to computers 702. Computers 702 include computers utilized by users 700. Computer 702a,702b or 702c can be a server, a desktop or laptop personal computer, a tablet computer, a smartphone, a set-top box, or any other computing device capable of accessing data center 700. User computer 702a or 702b connects directly to the Internet (e.g., via a cable modem). User computer 702c can be internal to the data center 700 and connect directly to the resources in the data center 700 via internal networks. Although only three user computers 702a,702b, and 702c are depicted, it should be appreciated that there can be multiple user computers.

Computers 702 are also utilized to configure aspects of the computing resources provided by data center 700. For example, data center 700 provides a Web interface through which aspects of its operation can be configured through the use of a Web browser application program executing on user computer 702. Alternatively, a stand-alone application program executing on user computer 702 can be used to access an application programming interface (API) exposed by data center 700 for performing the configuration operations.

Servers 716 are configured to provide the computing resources described above. One or more of the servers 716 are configured to execute a manager 770a or 770b (referred herein singularly as "a manager 770" or in the plural as "managers 770") configured to execute the virtual machines. The managers 720 can be a virtual machine monitor (VMM), fabric controller, or another type of program configured to enable the execution of virtual machines 718 on servers 716, for example.

It should be appreciated that although the embodiments disclosed above are discussed in the context of virtual machines, other types of implementations can be utilized with the concepts and technologies disclosed herein.

In the example data center 700 shown in FIG. 7, a network device 711 is utilized to interconnect the servers 716a and 716b. Network device 711 comprises one or more switches, routers, or other network devices. Network device 711 is also be connected to gateway 740, which is connected to communications network 730. Network device 711 facilitates communications within networks in data center 700, for example, by forwarding packets or other data communications as appropriate based on characteristics of such communications (e.g., header information including source and/or destination addresses, and protocol identifiers) and/or the characteristics of the private network (e.g., routes based on network topology). It will be appreciated that, for the sake of simplicity, various aspects of the computing systems and other devices of this example are illustrated without showing certain conventional details. Additional computing systems and other devices can be interconnected in other embodiments and interconnected in different ways.

It should be appreciated that the network topology illustrated in FIG. 7 has been greatly simplified and that many more networks and networking devices can be utilized to interconnect the various computing systems disclosed herein. These network topologies and devices should be apparent to those skilled in the art.

It should also be appreciated that data center 700 described in FIG. 7 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device comprise any combination of hardware or software that can interact and perform the described types of functionality, including desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules can, in some embodiments be combined in fewer modules or distributed in additional modules. Similarly, in some embodiments the functionality of some of the illustrated modules are not provided and/or other additional functionality can be implemented.

Figure 8:
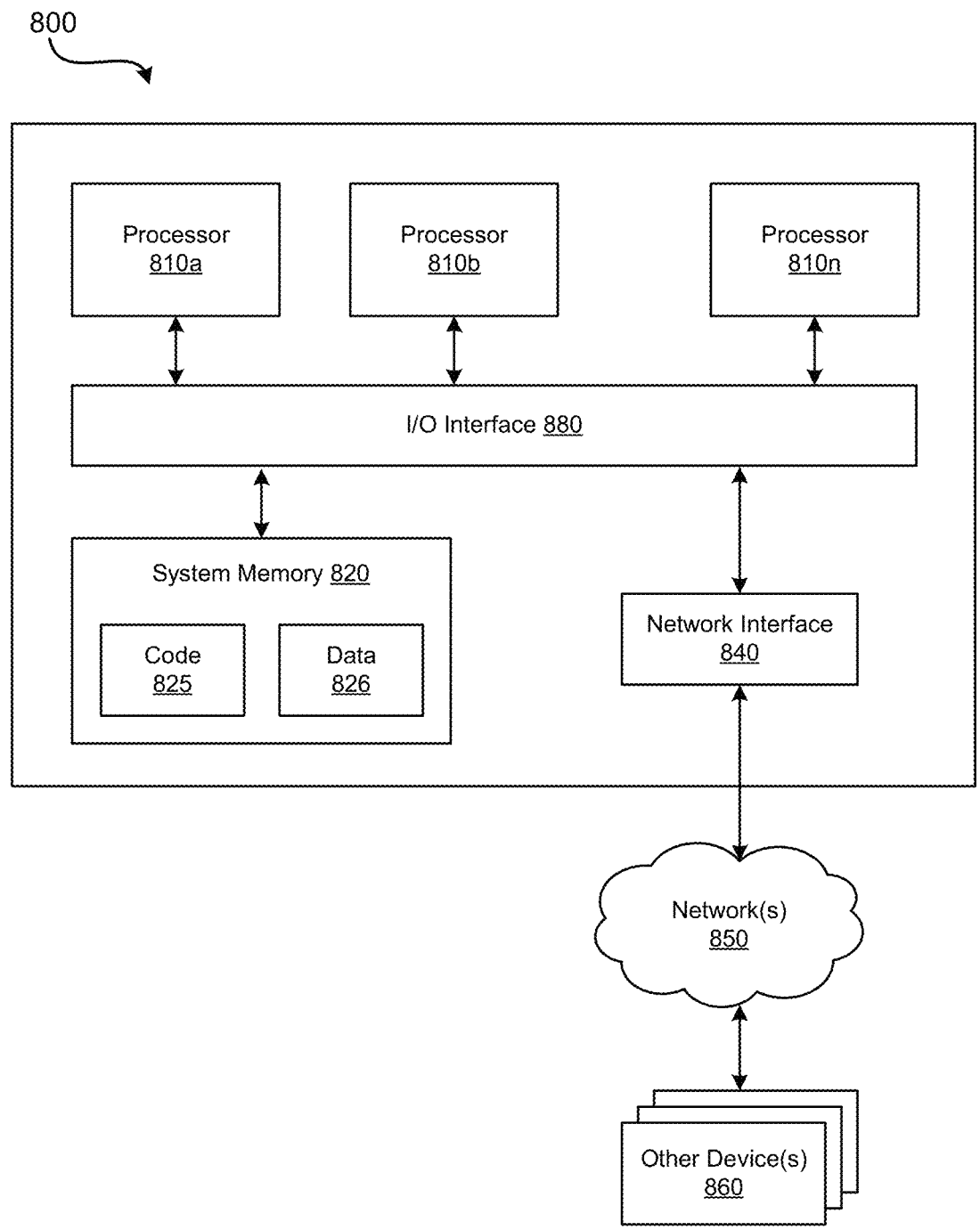
FIG. 8 is an example computing device in accordance with the present disclosure.

In some embodiments, a server that implements a portion or all of one or more of the technologies described herein, including the techniques to implement the communication of traffic includes a general-purpose computer system that includes or is configured to access one or more computer-accessible media. FIG. 8 illustrates such a general-purpose computing device 800. In the illustrated embodiment, computing device 800 includes a processing system comprising one or more processors 810a, 810b, and/or 810n (referred herein singularly as "a processor 810" or in the plural as "processors 810") coupled to a system memory 820 via an input/output (I/O) interface 830. Computing device 800 further includes a network interface 840 coupled to I/O interface 830.

In various embodiments, computing device 800 can be a uniprocessor system including one processor 810 or a multiprocessor system including several processors 810 (e.g., two, four, eight, or another suitable number). Processors 810 can be any suitable processors capable of executing instructions. For example, in various embodiments, processors 810 can be general-purpose or embedded processors implementing any of a variety of instruction set architectures (ISAs), such as the x86, PowerPC, SPARC, or MIPS ISAs, or any other suitable ISA. In multiprocessor systems, each of processors 810 commonly, but not necessarily, implement the same ISA.

System memory 820 is configured to store instructions and data accessible by processor(s) 810. In various embodiments, system memory 820 is implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 820 as code 825 and data 826.

In one embodiment, I/O interface 830 is configured to coordinate I/O traffic between the processor 810, system memory 820, and any peripheral devices in the device, including network interface 840 or other peripheral interfaces. In some embodiments, I/O interface 830 performs any necessary protocol, timing, or other data transformations to convert data signals from one component (e.g., system memory 820) into a format suitable for use by another component (e.g., processor 810). In some embodiments, I/O interface 830 includes support for devices attached through various types of peripheral buses, such as a variant of the Peripheral Component Interconnect (PCI) bus standard or the Universal Serial Bus (USB) standard, for example. In some embodiments, the function of I/O interface 830 is split into two or more separate components. Also, in some embodiments some or all of the functionality of I/O interface 830, such as an interface to system memory 820, can be incorporated directly into processor 810.

Network interface 840 is be configured to allow data to be exchanged between computing device 800 and other device or devices 860 attached to a network or network(s) 850, such as other computer systems or devices as illustrated in FIGS. 1 through 4, for example. In various embodiments, network interface 840 supports communication via any suitable wired or wireless general data networks, such as types of Ethernet networks, for example. Additionally, network interface 840 supports communication via telecommunications/telephony networks such as analog voice networks or digital fiber communications networks, via storage area networks such as Fibre Channel SANs or via any other suitable type of network and/or protocol.

In some embodiments, system memory 820 is one embodiment of a computer-accessible medium configured to store program instructions and data as described above for FIGS. 1-7 for implementing embodiments of the corresponding methods and apparatus. However, in other embodiments, program instructions and/or data are received, sent or stored upon different types of computer-accessible media. A computer-accessible medium includes non-transitory storage media or memory media, such as magnetic or optical media, e.g., disk or DVD/CD coupled to computing device 800 via I/O interface 830. A non-transitory computer-accessible storage medium also includes any volatile or non-volatile media, such as RAM (e.g., SDRAM, DDR SDRAM, RDRAM, SRAM) and ROM, that are included in some embodiments of computing device 800 as system memory 820 or another type of memory. Further, a computer-accessible medium include transmission media or signals such as electrical, electromagnetic or digital signals, conveyed via a communication medium such as a network and/or a wireless link, such those implemented via network interface 840. Portions or all of multiple computing devices, such as those illustrated in FIG. 8, are used to implement the described functionality in various embodiments; for example, software components running on a variety of different devices and servers collaborate to provide the functionality. In some embodiments, portions of the described functionality are implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein refer to a mass storage device, such as a solid-state drive, a hard disk or CD-ROM drive. However, it should be appreciated by those skilled in the art that computer-readable media can be any available computer storage media that can be accessed by a computing device.

By way of example, computer storage media include volatile and non-volatile, removable and non-removable media implemented in any method or technology for storage of information such as computer-readable instructions, data structures, program modules or other data. For example, computer media includes RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also transform the physical structure of the computer-readable media presented herein. The specific transformation of physical structure depend on various factors, in different implementations of this description. Examples of such factors include the technology used to implement the computer-readable media, whether the computer-readable media is characterized as primary or secondary storage, and the like. For example, if the computer-readable media is implemented as semiconductor-based memory, the software disclosed herein are encoded on the computer-readable media by transforming the physical state of the semiconductor memory. For example, the software transforms the state of transistors, capacitors, or other discrete circuit elements constituting the semiconductor memory. The software also transforms the physical state of such components in order to store data thereupon.

As another example, the computer-readable media disclosed herein can be implemented using magnetic or optical technology. In such implementations, the software presented herein transforms the physical state of magnetic or optical media, when the software is encoded therein. These transformations include altering the magnetic characteristics of particular locations within given magnetic media. These transformations also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices do not include all of the illustrated components shown in FIG. 8, include other components that are not explicitly shown in FIG. 8, or utilize an architecture completely different than that shown in FIG. 8.

The disclosure presented herein encompasses the subject matter set forth in the following example clauses.

Clause 1: A method for sending data over a communications network comprising a plurality of network devices, the method comprising:
  selecting a first logical link path and a second logical link path between a first endpoint and a second endpoint of the communications network, wherein the first logical link path and the second logical link path each comprise an International Organization for Standardization (OSI) layer 5 logical link path from the first endpoint to the second endpoint including a respective intermediate network device of the plurality of network devices, and wherein the respective intermediate network device for the first logical link path is different than the respective intermediate network device for the second logical link path;
  establishing a communications session between the first endpoint and second endpoint;
  communicating data packets for the communications session using the first logical link path;
  determining that a performance of the second logical link path is better than a performance of the first logical link path; and
  in response to determining the performance of the second logical link path is better than a performance of the first logical link path, communicating additional data packets for the communications session on the second logical link path.

Clause 2: The method of clause 1, further comprising:
  determining a metric indicative of packet latency for the first logical link path; and
  based on the metric, determining presence of a network condition at the communications network that is indicative of a performance degradation of the first logical link path.

Clause 3: The method of any of clauses 1-2, wherein the first logical link path and the second logical link path are established using a lossy link protocol.

Clause 4: The method of any of clauses 1-3, wherein the metric is a first metric, further comprising:
  determining a second metric indicative of a time of receipt of packets on the second logical link path; and
  determining that the second logical link path is healthy based on the second metric.

Clause 5: The method of any of clauses 1-4, wherein the data packets used for determining the metric are the data packets being communicated for the communications session.

Clause 6: The method of any of clauses 1-5, wherein the first logical link path and the second logical link path are defined by a 3-tuple comprising Internet Protocol (IP) addresses and ports.

Clause 7: The method of any of clauses 1-6, wherein the 3-tuple comprises a time that a packet was most recently received on the first logical link path and the second logical link path according to a local clock and a time that a packet was most recently sent on the first logical link path and the second logical link path according to the local clock.

Clause 8: The method of any of clauses 1-7, wherein the metric is determined based on a first scaling factor usable to characterize how quickly health degrades over time and second scaling factor usable to control how often to probe the second logical link path in addition to traffic on the first logical link path.

Clause 9: The method of any of clauses 1-8, wherein the first logical link path and the second logical link path are prioritized based on a resource cost of sending data on a respective link and a latency of the respective link.

Clause 10: A computing device comprising:
  a processing system; and
  a memory storing computer-executable instructions thereupon which, when executed by the processing system, cause the computing device to perform operations comprising:
  causing a first logical link path and a second logical link path to be established with a remote endpoint in a communications network comprising a plurality of network devices, the first and second logical link paths each comprising an OSI layer 5 link path including intermediate network devices, wherein the first logical link path and the second logical link paths have at least a different intermediate network device;
  establishing a communications session with the remote endpoint;
  communicating data packets for the communications session using the first logical link path;
  link path;
  determining a metric indicative of a time of receipt of packets on the first logical based on the metric, determining presence of a network condition at the communications network that is indicative of a performance degradation of the first logical link path; and
  in response to determining the presence of the network condition indicative of the performance degradation, communicating data packets for the communications session on the second logical link path.

Clause 11 The computing device of clause 10, wherein the first logical link path and the second logical link path are established using User Datagram Protocol (UDP).

Clause 12: The computing device of any of clauses 10 and 11, wherein the metric is a first metric, further comprising:

determining a second metric indicative of a time of receipt of packets on the second logical link path; and determining that the second logical link path is healthy based on the second metric.

Clause 13: The computing device of any clauses 10-12, wherein the first logical link path and the second logical link path are defined by a 3-tuple comprising Internet Protocol (IP) addresses and ports.

Clause 14: The computing device of any clauses 10-13, wherein the 3-tuple comprises a most recent time that a packet was received on the first logical link path and the second logical link path according to a local clock and a most recent time that a packet was sent on the first logical link path and the second logical link path according to the local clock.

Clause 15: The computing device of any clauses 10-14, wherein the metric is determined based on a first scaling factor usable to characterize how quickly health degrades over time and second scaling factor usable to control how often to probe the second logical link path in addition to traffic on the first logical link path.

Clause 16: A system comprising:
a processing system; and
a memory storing computer-executable instructions thereupon which, when executed by the processing system, cause the system to perform operations comprising:
determining a first logical link path and a second logical link path between a first endpoint and a second endpoint over a communications network comprising a plurality of network devices, wherein the first logical link path and the second logical link path each comprise an OSI layer 5 link path, and wherein the first logical link path and the second logical link paths have at least a different intermediate network device;
establishing a communications session between the first endpoint and second endpoint;
communicating data packets for the communications session using the first logical link path;
determining a metric indicative of a time of receipt of packets on the first logical link path;
based on the metric, determining presence of a network condition at the communications network that is indicative of a performance degradation of the first logical link path; and
in response to determining the presence of the network condition indicative of the performance degradation, communicating data packets for the communications session on the second logical link path.

Clause 17: The system of clause 16, wherein the first logical link path and the second logical link path are established using a lossy link protocol.

Clause 18: The system of any of clauses 16 and 17, the memory storing computer-executable instructions thereupon which, when executed by the processing system, cause the system to perform operations comprising:
based on the metric, determining that performance of the second logical link path has degraded; and
in response to determining that performance of the second logical link path has degraded, communicating data packets for the communications session on the first logical link path.

Clause 19: The system of any of the clauses 16-18, the memory storing computer-executable instructions thereupon which, when executed by the processing system, cause the system to perform operations comprising:

maintaining the communications session while switching communication of the data packets from the first logical link path to the second logical link path.

Clause 20: The system of any of the clauses 16-19, wherein the packets used for determining the metric are probe packets.

The disclosure presented herein encompasses the subject matter set forth in the following additional example clauses.

Clause 1: A method for determining health of a link in a communications network comprising a plurality of network devices, the method comprising:
establishing a first data link and a second data link between two endpoints of the communications network;
for each of the first and second data links, determining a first metric based on:
a first scaling factor for characterizing link health, and
a time at which a most recent packet was received on the respective data link;
for each of the first and second data links, determining a second metric determined based on a second scaling factor for controlling how often to probe the first and second data links in addition to regular data packets; and
based on the first and second metrics, selecting one of the first or second data links.

Clause 2: The method of clause 1, further comprising:
for each of the first and second data links, determining a third metric indicative of a hysteresis parameter for controlling when to switch between the first and second data links.

Clause 3: The method of any of clauses 1-2, wherein the hysteresis parameter is for controlling when to switch between first and second data links when the first and second data links have a health indicator within a threshold value.

Clause 4: The method of any of clauses 1-3, wherein the first metric is calculated by determining a product of the first scaling factor and a difference between a time at which the most recent packet was received and a current time, and applying the product as an exponent to a base 2.

Clause 5: The method of any of clauses 1-4, wherein the first metric is calculated by determining a product of the first scaling factor and a difference between a time at which the most recent packet was received and a current time, and applying the product as an exponent to a base e.

Clause 6: The method of any of clauses 1-5, wherein the second metric is calculated by determining a product of the second scaling factor and a difference between a time at which the most recent packet was sent and a current time.

Clause 7: The method of any of clauses 1-6, wherein the first scaling factor is selected so that a health change of the first or second data link over a time period that a packet is received is less than the second scaling factor.

Clause 8: The method of any of clauses 1-7, wherein a current data link is continued to be used when no packets are received on the current data link for at least a number of time units determined by a logarithm of a difference between 1 and the second scale factor, the logarithm divided by the negative of the first scale factor.

Clause 9: The method of any of clauses 1-8, further comprising sending data between the two endpoints using the selected one of the first or second data links.

Clause 10: A computing device comprising:
a processing system; and a memory storing computer-executable instructions thereupon which, when executed by the processing system, cause the computing device to perform operations comprising:

causing a first data link path and a second data link path to be established with remote endpoint in a communications network comprising a plurality of network devices;

for each of the first and second data links, determining a first metric based on:

a first scaling factor for characterizing link health over time, and a time at which a most recent packet was received on the respective data link;

for each of the first and second data links, determining a second metric determined based on a second scaling factor for controlling how frequently to probe the first and second data links; and based on the first and second metrics, selecting one of the first or second data links.

Clause 11 The computing device of clause 10, wherein a Bayesian estimator is used to measure link health.

Clause 12: The computing device of any of clauses 10 and 11, the memory storing computer-executable instructions thereupon which, when executed by the processing system, cause the computing device to perform operations comprising:

for each of the first and second data links, determining a third metric indicative of a hysteresis parameter for controlling when to switch between first and second data links.

Clause 13: The computing device of any clauses 10-12, wherein the hysteresis parameter is for controlling when to switch between first and second data links when the first and second data links have a health indicator within a threshold value.

Clause 14: The computing device of any clauses 10-13, wherein the first metric is calculated by determining a product of the first scaling factor and a difference between a time at which the most recent packet was received and a current time, and applying the product as an exponent to a base 2.

Clause 15: The computing device of any clauses 10-14, wherein the first metric is calculated by determining a product of the first scaling factor and a difference between a time at which the most recent packet was received and a current time, and applying the product as an exponent to a base e.

Clause 16: The computing device of any clauses 10-15, wherein the second metric is calculated by determining a product of the second scaling factor and a difference between a time at which the most recent packet was sent and a current time.

Clause 17: A system comprising:

a processing system; and a memory storing computer-executable instructions thereupon which, when executed by the processing system, cause the system to perform operations comprising:

establishing a first data link and a second data link between two endpoints;

for each of the first and second data links, determining a first metric based on:

a first scaling factor for characterizing degradation of link health over time, and a time at which a most recent packet was received on the respective data link;

for each of the first and second data links, determining a second metric determined based on a second scaling factor for controlling when to probe the first and second data links in addition to regular traffic; and based on the first and second metrics, selecting one of the first or second data links.

Clause 18: The system of clause 17, wherein the first scaling factor is selected so that a health change of the first or second data link over a time period that a packet is received is less than the second scaling factor.

Clause 19: The system of any of clauses 17 and 18, wherein a current data link is continued to be used when no packets are received on the current data link for at least a number of time units determined by a logarithm of a difference between 1 and the second scale factor, the logarithm divided by the negative of the first scale factor.

Clause 20: The system of any of the clauses 17-19, the memory storing computer-executable instructions thereupon which, when executed by the processing system, cause the system to perform operations comprising:

for each of the first and second data links, determining a third metric indicative of a hysteresis parameter for controlling when to switch between the first and second data links, wherein the hysteresis parameter is for controlling when to switch between first and second data links when the first and second data links have a health indicator within a threshold value.

The invention claimed is:

1. A method for sending data over a communications network comprising a plurality of network devices, the method comprising:

selecting a first logical link path and a second logical link path between a first endpoint and a second endpoint of the communications network, wherein the first logical link path and the second logical link path each comprise an International Organization for Standardization (OSI) layer 5 logical link path from the first endpoint to the second endpoint including a respective intermediate network device of the plurality of network devices, and wherein the respective intermediate network device for the first logical link path is different than the respective intermediate network device for the second logical link path, and wherein the first logical link path and the second logical link path are active links between the first endpoint and the second endpoint;

establishing a communications session between the first endpoint and second endpoint;

communicating data packets for the communications session using the first logical link path;

determining that a performance of the second logical link path is better than a performance of the first logical link path; and in response to determining the performance of the second logical link path is better than a performance of the first logical link path, communicating additional data packets for the communications session on the second logical link path.

2. The method of claim 1, further comprising:

determining a metric indicative of packet latency for the first logical link path; and based on the metric, determining presence of a network condition at the communications network that is indicative of a performance degradation of the first logical link path.

3. The method of claim 1, wherein the first logical link path and the second logical link path are established using a lossy link protocol.

4. The method of claim 2, wherein the metric is a first metric, further comprising:
 determining a second metric indicative of a time of receipt of packets on the second logical link path; and
 determining that the second logical link path is healthy based on the second metric.

5. The method of claim 2, wherein the data packets used for determining the metric are the data packets being communicated for the communications session.

6. The method of claim 1, wherein the first logical link path and the second logical link path are defined by a 3-tuple comprising Internet Protocol (IP) addresses and ports.

7. The method of claim 6, wherein the 3-tuple comprises a time that a packet was most recently received on the first logical link path and the second logical link path according to a local clock and a time that a packet was most recently sent on the first logical link path and the second logical link path according to the local clock.

8. The method of claim 2, wherein the metric is determined based on a first scaling factor usable to characterize how quickly health degrades over time and second scaling factor usable to control how often to probe the second logical link path in addition to traffic on the first logical link path.

9. The method of claim 1, wherein the first logical link path and the second logical link path are prioritized based on a resource cost of sending data on a respective link and a latency of the respective link.

10. A computing device comprising:
 a processing system; and
 a memory storing computer-executable instructions thereupon which, when executed by the processing system, cause the computing device to perform operations comprising:
  causing a first logical link path and a second logical link path to be established with a remote endpoint in a communications network comprising a plurality of network devices, the first and second logical link paths each comprising an OSI layer 5 link path including intermediate network devices, wherein the first logical link path and the second logical link paths have at least a different intermediate network device, and wherein the first logical link path and the second logical link path are active links with the remote endpoint;
  establishing a communications session with the remote endpoint;
  communicating data packets for the communications session using the first logical link path;
  determining a metric indicative of a time of receipt of packets on the first logical link path;
  based on the metric, determining presence of a network condition at the communications network that is indicative of a performance degradation of the first logical link path; and
  in response to determining the presence of the network condition indicative of the performance degradation, communicating data packets for the communications session on the second logical link path.

11. The computing device of claim 10, wherein the first logical link path and the second logical link path are established using User Datagram Protocol (UDP).

12. The computing device of claim 10, wherein the metric is a first metric, further comprising:
 determining a second metric indicative of a time of receipt of packets on the second logical link path; and
 determining that the second logical link path is healthy based on the second metric.

13. The computing device of claim 10, wherein the first logical link path and the second logical link path are defined by a 3-tuple comprising Internet Protocol (IP) addresses and ports.

14. The computing device of claim 13, wherein the 3-tuple comprises a most recent time that a packet was received on the first logical link path and the second logical link path according to a local clock and a most recent time that a packet was sent on the first logical link path and the second logical link path according to the local clock.

15. The computing device of claim 10, wherein the metric is determined based on a first scaling factor usable to characterize how quickly health degrades over time and second scaling factor usable to control how often to probe the second logical link path in addition to traffic on the first logical link path.

16. A system comprising:
 a processing system; and
 a memory storing computer-executable instructions thereupon which, when executed by the processing system, cause the system to perform operations comprising:
  determining a first logical link path and a second logical link path between a first endpoint and a second endpoint over a communications network comprising a plurality of network devices, wherein the first logical link path and the second logical link path each comprise an OSI layer 5 link path, and wherein the first logical link path and the second logical link paths have at least a different intermediate network device, and wherein the first logical link path and the second logical link path are active links between the first endpoint and the second endpoint;
  establishing a communications session between the first endpoint and second endpoint;
  communicating data packets for the communications session using the first logical link path;
  determining a metric indicative of a time of receipt of packets on the first logical link path;
  based on the metric, determining presence of a network condition at the communications network that is indicative of a performance degradation of the first logical link path; and
  in response to determining the presence of the network condition indicative of the performance degradation, communicating data packets for the communications session on the second logical link path.

17. The system of claim 16, wherein the first logical link path and the second logical link path are established using a lossy link protocol.

18. The system of claim 16, the memory storing computer-executable instructions thereupon which, when executed by the processing system, cause the system to perform operations comprising:
 based on the metric, determining that performance of the second logical link path has degraded; and
 in response to determining that performance of the second logical link path has degraded, communicating data packets for the communications session on the first logical link path.

19. The system of claim 16, the memory storing computer-executable instructions thereupon which, when executed by the processing system, cause the system to perform operations comprising:
 maintaining the communications session while switching communication of the data packets from the first logical link path to the second logical link path.

20. The system of claim 16, wherein the packets used for determining the metric are probe packets.

* * * * *